United States Patent

[11] 3,565,220

| [72] | Inventors | Edward J. Lammers;<br>George E. Schubert; Thomas F. Teter,<br>Aurora, Ill. |
|---|---|---|
| [21] | Appl. No. | 854,713 |
| [22] | Filed | Sept. 2, 1969 |
| [45] | Patented | Feb. 23, 1971 |
| [73] | Assignee | Caterpillar Tractor Co.<br>Peoria, Ill. |

[54] A TRANSMISSION NEUTRALIZER OPERATED BY SERVICE AND PARKING BRAKES
4 Claims, 1 Drawing Fig.

[52] U.S. Cl. .................................................. 192/4;
192/13; 303/5
[51] Int. Cl. .................................................. F16h 57/10
[50] Field of Search ........................................... 192/4, 4
(A), 4 (R), 13 (Cursory)

[56] References Cited
UNITED STATES PATENTS

| 3,033,333 | 5/1962 | Breting et al. .................. | 192/4A |
| 3,181,667 | 5/1965 | Lohbauer et al. ............... | 192/4A |
| 3,339,672 | 9/1967 | Crandall ....................... | 192/4R X |

*Primary Examiner*—Benjamin W. Wyche
*Attorney*—Fryer, Tjensvold, Feix, Phillips and Lempio ABSTRACT: A control system for a vehicle having air-actuated service brakes, air-actuated parking brakes and a hydraulically actuated power transmission is provided with a common interconnection between both sets of brakes and the transmission so that the transmission may be quickly neutralized when either set of brakes is applied. The system also includes a warning means associated with the parking brakes and means for allowing the operator of the vehicle to override the warning means.

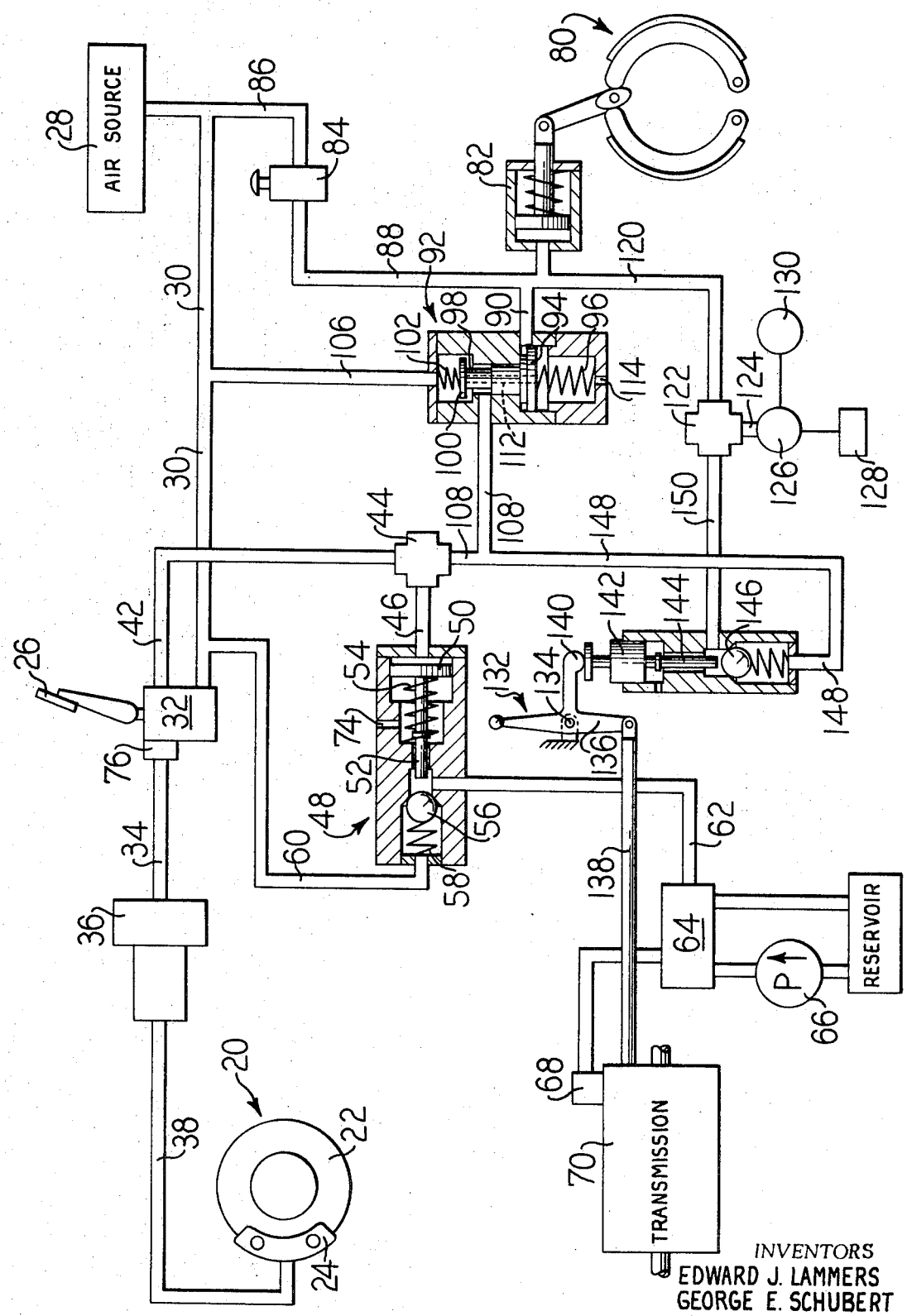

A TRANSMISSION NEUTRALIZER OPERATED BY SERVICE AND PARKING BRAKES

BACKGROUND OF THE INVENTION

This invention is related to an improved vehicle brake control system for a vehicle having air-actuated service brakes, air-actuated parking brakes and a hydraulically actuated power transmission. More particularly, the invention is directed to an improved vehicle brake control system wherein both the service brakes and the parking brakes are interconnected to a transmission neutralizer valve by means which function to quickly neutralize the transmission when either the service brakes or the parking brakes are applied.

The invention is also directed to a warning means located in the cab of the vehicle and associated with the parking brakes for indicating to the operator when the air supply to the parking brakes drops below a predetermined level. The warning means are interconnected with manually operable means located in the cab of the vehicle to allow the operator to override the warning means.

The invention has particular advantage with respect to vehicles such as loaders of the type in which an engine is employed to power the vehicle for movement from place to place and is also employed to provide power to raise and manipulate a bucket, fork or other material handling device carried by the vehicle. It is desirable in this type of vehicle to employ a connection between the brake pedal and the transmission to neutralize the transmission upon actuation of the brakes. This has the advantage of freeing the hands of the operator to manipulate the bucket control, instead of actuating a transmission or clutch lever first, and also ensures availability of the full power of the engine for manipulating the bucket (or similar implement) without delay.

The principle object of the invention is the provision of a control system which will quickly neutralize the transmission when either the service brakes or the parking brakes are applied in order to avoid undue wear to the clutches and braking elements of the transmission.

Another object of the invention is the provision of a control system having means for shutting off warning devices which are actuated when the parking brake air supply is low, such as when the parking brake is applied. This can be a very desirable feature in situations where the vehicle must be maintained in a braked position for several minutes and the warning devices may become very irritating to the operator of the vehicle.

Other and further objects and advantages of the present invention will be apparent from the following description and claims and are illustrated in the accompanying drawing which, by way of illustration, shows preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING

The drawing is a schematic view of the brake control system of the present invention wherein certain components of the control system are shown in cross section.

DESCRIPTION OF THE PREFERRED EMBODIMENT

Referring now to the drawing, there is shown an overall schematic view of a control circuit for a brake system which brake system includes both service brakes and a parking brake. One of the vehicle service brakes is shown at 20 and is preferably of a conventional design wherein a disc 22 mounted to the vehicle axle is gripped by a caliper brake assembly 24 which is secured to the vehicle.

The service brake 20 may be applied by depressing a brake pedal 26. By depressing the brake pedal 26, pressurized air from a source 28 passes through a conduit 30 and then through a valve 32 to a conduit 34 which communicates with a power cluster master cylinder 36. The master cylinder 36 then communicates pressurized hydraulic fluid to a conduit 38 thereby causing actuation of the brakes 20.

Depressing the brake pedal 26 also directs pressurized air through the valve 32 to a conduit 42 and a double check valve 44. A conduit 46 then communicates the pressurized air in circuit 42 with a booster relay valve 48. The pressurized air entering the valve 48 exerts pressure on a piston 50 which has a plunger 52 integrally formed thereon.

The air pressure entering through conduit 46 is sufficient to overcome the bias of a spring 54 whereby the plunger 52 moves into contact with and unseats a ball valve 56 which is normally held in the seated position by spring 58. Unseating the ball valve 56 allows pressurized air from the line 30 to pass through a conduit 60, around the ball valve 56, and out a conduit 62 to a neutralizer valve 64.

Applying air pressure to the neutralizer valve shifts a valve spool (not shown) in the neutralizer valve from a normally open position to a position which interrupts the flow of pressure from a pump 66 and relieves the pressure from a control 68 which neutralizes the transmission 70 in a manner well known to those skilled in the art. Thus, depressing the brake pedal 26 serves to actuate the service brakes 20 and also neutralizes the transmission 70.

When the brake pedal 26 is released, the flow of air through valve 32 is blocked and the air in conduit 42 is exhausted to the atmosphere. When the conduit 42 is exhausted to the atmosphere, the spring 54 in booster valve 48 forces the piston 50 and plunger 52 to the position shown whereby ball valve 56 again seats to block the flow of air through the valve. With the booster valve in this condition, the conduit 62 is vented to the atmosphere by way of a passage 74 formed in the housing of valve 48.

Releasing the brake pedal 26 also allows the air in the power cluster master cylinder 36 to be exhausted to the atmosphere. However, the air coming from the master cylinder 36 back through the conduit 34 is restricted by an orifice check valve 76 to insure that the transmission is engaged prior to releasing the brakes.

The brakes system also includes a parking brake 80 which is adapted to be actuated by a spring-loaded cylinder 82 when air is exhausted from the head end of the cylinder. A hand-actuated control valve 84 may be operated to direct air from the air source 28 through a conduit 86 and then through a conduit 88 to the cylinder 82.

In order to apply the parking brake 80, the valve 84 is moved to a position which blocks the passage of air from the air source 28 and simultaneously exhausts the air in cylinder 82 and conduit 88 to the atmosphere. Thus, when the parking brake 80 is applied, air is exhausted from the conduit 88 and a branch conduit 90 which latter conduit is in communication with an inversion valve 92.

Airflow through the valve 92 is controlled by a piston 94 which is urged to the position shown by a spring 96 when the parking brake is applied by operation of the valve 84. When the inversion valve 92 is urged to the position shown, an extension 98 of piston 94 unseats a flat valve 100 which is normally biased downwardly to a closed position by the spring 102. With the inversion valve 92 in the position shown, air can pass from the air source 28 through the conduit 30 to a conduit 106, then through the inversion valve 92 to a conduit 108.

The conduit 108 communicates air pressure through the double check valve 44 to the booster valve 48, which is then actuated to unseat the ball valve 56. At this juncture it should be noted that fluid communication to conduit 108 is blocked when conduit 42 is pressurized and vice versa. Unseating of the ball valve 56 communicates air pressure at the air source 28 through the conduits 30, 60, and 62 to the neutralizer valve 64 which neutralizes the transmission 70 in a manner previously described with respect to the service brakes 20.

It may be observed that both the service brakes 20 and the parking brake 80 have an interconnection with the neutralizer valve 64 via the booster valve 48. This interconnection has the important advantage of supplying air pressure from the air source 28 directly to the neutralizer valve 64 which effectively neutralizes the transmission when either of these sets of brakes are applied.

The parking brake 80 may be disengaged by moving the control valve 84 to a position which directs air through conduit 88 to the cylinder 82. This air pressure overcomes the force on the spring-biased piston in the cylinder 82 and moves the piston to a position which releases the parking brake 82.

Air pressure is simultaneously directed from the conduit 88 to the conduit 90 to provide a source of working air for the inversion valve 92. Air pressure entering through the conduit 90 exerts pressure to the upper side of piston 94 and moves the piston downwardly to a seated position. Movement of the piston 94 to its seated position also moves the piston extension 98 downwardly below the seating surface for the flat valve 100 so that the flat valve 100 seats and blocks airflow from the conduit 106 to the conduit 108.

With the piston 94 in its lower seated position, a small space exists between the lower side of the flat valve 100 and the upper surface portion of the piston extension 98. The existence of this small space or passage allows air to be exhausted from the booster valve 48 to the conduit 108 downwardly through an internal bore 112 formed in the piston 94 and then through an exhaust passage 114 formed in the base of the inversion valve housing. Consequently, when the parking brake 80 is released, the inversion valve 92 is moved to a position which allows air to be exhausted from the booster valve 48 which in turn blocks airflow to the neutralizer valve 64 and permits the transmission to be reengaged as previously described.

The conduit 88 also communicates with a conduit 120 which leads to a double check valve 122. A branch conduit 124 leads from the double check valve 122 to a pressure actuated switch 126 which controls a buzzer 128 and a dash-mounted visual indicator 130. The buzzer 128 and the indicator 130 are warning devices to alert the operator of the vehicle when the air pressure in conduit 120 is low, such as when the parking brake 80 is applied.

Since there are instances where these warning devices may annoy the operator of the vehicle, it has been made possible to manually shut off the buzzer and indicator by manipulating a safety control lever shown at 132. The lever is pivotally mounted at 134 and has a first arm 136 which has a rod 138 attached thereto. The rod 138 is connected to the transmission 70 in a manner such that when the lever 132 is moved in a clockwise direction, the transmission is mechanically shifted to neutral.

Clockwise movement of the lever 132 also causes a second arm 140 of the lever to depress a plunger 142. When the plunger 142 is depressed a rod extension 144 unseats a ball valve 146 which permits air to pass from a line 148 (which is connected to the line 108) to a line 150. The air pressure in conduit 150 causes the double check valve 122 to move to a position which communicates conduit 150 with conduit 124 and blocks communications from the conduit 120 to the conduit 124. Air pressure in the conduit 124 is then directed to the pressure switch 126 and actuates the switch to break the circuit which supplies electrical current to the buzzer 128 and the indicator 130.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

I claim:

1. In a vehicle which has air-actuated service brakes, air-actuated parking brakes, and a hydraulically actuated power transmission; means including a source of air under pressure; first valve means for controlling air supply from the air source to the service brakes; second valve means for controlling air supply from the air source to the parking brakes; booster valve means operable to communicate air supply from the air source to a transmission neutralizer valve; said transmission neutralizer valve operable, when actuated by the booster valve, to disengage the transmission; said first valve means having a first interconnection with the booster valve whereby operation of the first valve means to apply the service brakes causes the booster valve to communicate air supply to the transmission neutralizer value to thereby neutralize the transmission; and said second valve means having a second interconnection with the booster valve whereby operation of the second valve means to apply the parking brakes causes the booster valve to communicate air supply to the transmission to the neutralizer valve to thereby neutralize the transmission.

2. Apparatus as set forth in claim 1 wherein operation of the first valve means to disengage the service brakes causes the booster valve to block air supply to the transmission neutralizer valve whereby the neutralizer valve reengages the transmission, and wherein operation of the second valve means to disengage the parking brakes causes the booster valve to block air supply to the transmission neutralizer valve, whereby the neutralizer valve reengages the transmission.

3. Apparatus as set forth in claim 1 and further including warning means located in the cab of the vehicle and operably associated with the second valve means and the parking brakes, said warning means including an air pressure operated switch which actuates the warning means when the air supply pressure to the parking brakes drops below a predetermined level, and manually operable valve means for controlling air supply from the air source to the pressure switch to thereby allow the operator of the vehicle to override the warning means.

4. Apparatus as set forth in claim 3 wherein the last mentioned manually operable valve includes means interconnected with the transmission for disengaging the transmission when the manual valve is operated to override the warning means.